(12) United States Patent
Hepper et al.

(10) Patent No.: US 8,958,274 B2
(45) Date of Patent: Feb. 17, 2015

(54) METHOD AND SYSTEM FOR DETERMINING THE QUALITY OF A STORAGE SYSTEM

(75) Inventors: Dietmar Hepper, Hannover (DE); Oliver Theis, Kalletal (DE); Xiaoming Chen, Hannover (DE); Herbert Hoelzemann, Villingen (DE); Gael Pilard, Wankheim (DE)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/820,543

(22) PCT Filed: Sep. 6, 2011

(86) PCT No.: PCT/EP2011/065394
§ 371 (c)(1),
(2), (4) Date: Mar. 4, 2013

(87) PCT Pub. No.: WO2012/032047
PCT Pub. Date: Mar. 15, 2012

(65) Prior Publication Data
US 2013/0155827 A1 Jun. 20, 2013

(30) Foreign Application Priority Data
Sep. 8, 2010 (EP) .................................... 10305963

(51) Int. Cl.
*G11B 17/00* (2006.01)
*G11B 20/18* (2006.01)
(Continued)

(52) U.S. Cl.
CPC .......... *G11B 20/1816* (2013.01); *G11B 7/1267* (2013.01); *G11B 7/24* (2013.01); *G11B 20/182* (2013.01); *G11B 20/20* (2013.01); *G11B 20/10481* (2013.01); *G11B 2220/2537* (2013.01)

USPC .......................... 369/47.5; 369/53.2; 714/719

(58) Field of Classification Search
USPC .............. 369/47.27, 47.5, 53.2, 53.22, 53.26, 369/53.44, 59.11, 116; 360/53; 714/719
See application file for complete search history.

(56) References Cited

U.S. PATENT DOCUMENTS

| 5,513,214 A | 4/1996 | Gozzo |
| 5,987,634 A | 11/1999 | Behrens et al. |

(Continued)

FOREIGN PATENT DOCUMENTS

| EP | 1262971 | 12/2002 |
| EP | 1585129 A2 | 10/2005 |

(Continued)

OTHER PUBLICATIONS

Shima et al., "Readout durability improvement of super-resolution near-field structure discs with PtOx-SiO2 recording and GeNy, interfacial layers", Jap.Journ.Appl.Physics, Pt 2, vol. 46, No. 4-7, pp. L135-L137, Feb. 2007.

(Continued)

*Primary Examiner* — Brenda Bernardi
(74) *Attorney, Agent, or Firm* — Jack Schwartz & Associates, PLLC (57) ABSTRACT

In accordance with an exemplary embodiment of the present invention, a method for measuring a quality parameter of an optical storage system comprising a non-diffraction-limited optical storage medium and a readout device, the method comprising the process of deriving an impulse response of the optical storage system, and the process of analyzing the impulse response to determine at least one of a width of the impulse response and a skewness of the impulse response as the quality parameter.

12 Claims, 6 Drawing Sheets

(51) Int. Cl.
*G11B 7/1267* (2012.01)
*G11B 7/24* (2013.01)
*G11B 20/20* (2006.01)
*G11B 20/10* (2006.01)

(56) References Cited

U.S. PATENT DOCUMENTS

| | | | |
|---|---|---|---|
| 6,005,731 | A | 12/1999 | Foland, Jr. et al. |
| 6,744,814 | B1 | 6/2004 | Blanksby et al. |
| 6,847,600 | B2 | 1/2005 | Kashihara et al. |
| 2002/0060827 | A1 | 5/2002 | Agazzi |
| 2002/0141694 | A1 | 10/2002 | Caplan et al. |
| 2004/0199368 | A1* | 10/2004 | Bechhoefer ............. 703/7 |
| 2005/0105418 | A1 | 5/2005 | Kuwahara et al. |
| 2005/0190630 | A1 | 9/2005 | Fujimoto et al. |
| 2009/0034391 | A1 | 2/2009 | Aoki et al. |
| 2012/0026623 | A1* | 2/2012 | Mathew et al. ............. 360/49 |

FOREIGN PATENT DOCUMENTS

| | | |
|---|---|---|
| EP | 2040255 A2 | 3/2009 |
| EP | 2169675 | 3/2010 |
| JP | 2003323770 | 11/2003 |
| JP | 2006323961 | 11/2006 |

OTHER PUBLICATIONS

Han, "Blind channel equalization using fourth-order cumulants", IEICE Trans. Comm., vol. E87-B, No. 10, pp. 3116-3124, Oct. 2004.

Singh et al., "SOVA decoding with blind channel estimation in a SIMO fir CHANNEL.", MILCOM 2006 CD-ROM, 2007.

Nagai et al.: "A new method of evaluating signal quality for systems to which partial response and maximum likelihood is applied" of Feb. 28, 2003, JJAP Japanese Journal of Applied Physics, URL: http://jjap.jsap.jp/link?JJAP/42/971/.

Search Report Dated Oct. 7, 2011.

Bergmans, "Digital Baseband Transmission and Recording", 1996.

Pichon, "Enregistrement Optique Haute Densite: Etude Physique et Physico-chimique du Phenomene de Super-Resolution", Sep. 25, 2008.

Pichon, "Enregistrement Optique Haute Densite: Etude Physique et Physico-Chimique du Phenomene de Super-Resolution", Institut Polytechnique de Grenoble, Sep. 28, 2008.

Lee et al., "Blu-ray Type Super-Resolution Near-Field Phase Change Disk with In2G38Sb85Te5 Mask Layer", Japanese Journal of Applied Physics, vol. 47, No. 7, 2008, pp. 6025-6028.

* cited by examiner

METHOD AND SYSTEM FOR DETERMINING THE QUALITY OF A STORAGE SYSTEM

This application claims the benefit, under 35 U.S.C. §365 of International Application PCT/EP2011/065394, filed Sep. 6, 2011, which was published in accordance with PCT Article 21(2) on Mar. 15, 2012 in English and which claims the benefit of European patent application No. 10305963.0, filed Sep. 8, 2010.

The present invention relates generally to a method and system for determining the quality of an optical data storage system. More particularly, the present invention relates to a method and system for determining the quality of a non-diffraction-limited optical data storage system and/or of non-diffraction-limited optical data storage media.

Optical storage media are media in which data are stored in an optically-readable manner, such as, for example, as tiny spaced-apart indentations. The indentations are referred to as pits whereas the spaces between the indentations are referred to as lands. The pits and lands are formed in tracks in one or more layers of the media. The distance separating the tracks is referred to as the track pitch. An optical system reads optical data stored on optical storage media by means of a pickup mechanism that includes a laser beam integrated with a photo-detector that detects laser light reflecting from the data features, i.e., the pits and lands, formed thereon.

Instead of lands and pits, recordable media usually have marks and spaces, tiny areas of different reflectivity (e.g. amorphous vs. crystalline material), which when scanned create differences in the read-out signal similar to pits and lands.

A large variety of optical storage media are known, with several particular formats being the most commonly used. These formats include compact disc or CD, digital versatile disc or DVD, and Blu-ray Disc or BD. The CD format has a minimum pit length of approximately 0.85 µm, a track pitch of approximately 1.6 µm, and uses a red laser beam having a wavelength of approximately 780 nm detected by a lens having a numerical aperture of 0.45. A standard-sized CD has a data capacity of approximately 700 megabytes. The DVD format has a pit length of approximately 0.44 µm, a pitch of approximately 0.74 µm, and uses a red laser beam having a wavelength of approximately 650 nm detected by a lens having a numerical aperture of 0.60. A standard-sized, single-layer DVD has a data capacity of approximately 4.7 gigabytes. The BD format has a pit length of approximately 0.138 µm, a track pitch of approximately 0.32 µm, uses a blue or violet laser beam having a wavelength of approximately 405 nm detected by a lens having a numerical aperture of 0.85. The standard-sized BD has a data capacity of approximately 25 GB per layer.

Thus, the trend of increasing data capacity in optical media by reducing the dimensions of the data features through the use of shorter wavelength laser light and larger numerical apertures is observed. The shorter wavelength laser light enables resolution of smaller data features, i.e., pits and lands. The larger numerical aperture allows a wider angle of light, i.e., light from increasingly oblique angles relative to the lens, to enter the lens and provides a shorter focal length resulting in a higher level of magnification.

However, the above-described straightforward approach to increasing data capacity and/or reducing data feature size by shortening wavelengths of the light source and increasing the numerical aperture has certain limitations. For example, an increase in the numerical aperture, or NA, beyond the 0.85 used in the BD format requires the use of near-field optics. Near-field optics, however, have inherent complexities and practical limitations, such as, for example, requiring a more complex detection system that provides tight control of the distance between the optical head and the media, which render the use of near field optics incompatible with existing optical media players and/or recorders.

The relatively new technique of super-resolution near-field structure, alternatively referred to as SuperRENS, the SuperRENS Effect, or super-resolution effect, enables writing and/or reading optical data bits that are much smaller than the resolution limit of the optical head without increasing the complexity of the detection system. The SuperRENS technique is thus largely compatible with existing optical media players and/or recorders. Generally, the SuperRENS technique includes the use of an optical medium having a thin film stack comprised of an active layer sandwiched between an upper and lower dielectric layer. The thin film stack produces a nonlinear transmittance change in the light reflected from the data features on the optical media. It is anticipated that SuperRENS discs will have a capacity of 100 to 250 gigabytes or higher.

The prior formats, i.e., CD, DVD and BD, are diffraction-limited formats in that certain quality-determining characteristics thereof, including spatial cut-off frequency as an indication of bandwidth, are determined solely by the parameters of the optical system. More particularly, the cut-off frequency of the diffraction-limited formats is given by the formula:

$$f_c = 2\frac{NA}{\lambda},$$

where NA is the numerical aperture and $\lambda$ is the wavelength of the laser light.

However, the SuperRENS and other likely future optical disc technologies are not diffraction-limited but rather have capabilities beyond the diffraction limit of the optics system. Thus, the above formula is not applicable to determine the cut-off frequency of such non-diffraction-limited formats. Further, estimating the overall quality of non-diffraction-limited discs and/or storage systems, including estimating the cut-off frequency or bandwidth of a SuperRENS disc or system, is complicated by the different material properties of the various materials used in the multi-layer thin film stacks formed on the discs or media utilized by SuperRENS and likely to be used by the new technologies.

Known methods for estimating the quality of storage discs and/or systems include those described in U.S. Pat. Nos. 6,005,731 and 5,987,634, hereinafter collectively referred to as the Cirrus patents, U.S. Pat. No. 6,847,600, referred to hereinafter as the Kashihara patent, and in an article by Nagai, et al., appearing in the Japanese Journal of Applied Physics, Jpn. J. Appl. Phys. 42, 2003, pp. 971-975, hereinafter referred to as Nagai, et al.

The Cirrus patents relate generally to magnetic storage media and/or systems. These patents describe a channel quality circuit that generates and writes to a storage system a test pattern of digital data. As the test pattern is read from the storage system, the channel quality circuit derives data indicative of the performance of the storage system. The performance data is used to calibrate the read channel, estimate the bit error rate of the system, and to detect defects in the magnetic medium. However, this method is tailored to magnetic storage media and/or systems, and disadvantageously requires the determination of various statistical measures.

The Kashihara patent is generally directed to optical storage media and/or systems. It provides an estimation method that produces a reproduction signal from the information recorded on the optical disc. The reproduction signal is processed by an equalizer to produce an equalization signal. The distribution levels of the equalization signal are synthesized over n+1 levels, thereby creating a new distribution. The standard deviation of the new distribution is used as an estimate of the quality of the reproduction apparatus or of the optical disc, and which can be used to adjust the reproduction apparatus. However, this method disadvantageously requires additional signal and/or data processing to accomplish equalization of the signal and Viterbi decoding, and the quality measure is only available after such processing.

Nagai, et al., describes a method of determining the quality of an optical channel using a value defined as the occurrence probability of miss-detection in the partial-response maximum-likelihood method, or PRML. However, this method also disadvantageously requires the overhead that accompanies equalization and detection.

Accordingly, what is needed in the art is a system and method for determining the quality of non-diffraction-limited optical discs and/or optical storage systems. Further, and more particularly, what is needed in the art is a method and/or system for estimating the readout bandwidth or cut-off frequency of a non-diffraction-limited optical storage disc and/or storage system.

Exemplary embodiments of the present invention are described with reference to the accompanying drawings. The described embodiments merely exemplify the invention. Plural possible modifications are apparent to the skilled person. The gist and scope of the present invention is defined in the appended claims of the present application.

A method for measuring a quality parameter of an optical storage system and/or non-diffraction limited optical storage medium is provided herein. The method comprises deriving an impulse response of the optical storage system, based in part upon a sequence of impulse response samples, and determining as the quality parameter at least one of a width of the impulse response and a skewness of the impulse response.

In one exemplary embodiment, the optical storage medium contains one or more of predefined sync data, predefined test data, and predefined user data. The impulse response is derived dependent at least in part upon a readout signal from the storage medium of the one or more predefined sync, test or user data.

In another exemplary embodiment, the width of the impulse response is determined by evaluating one of the spatial distance of those locations where the impulse response has decreased to a predefined fraction, e.g. 1/e, of its maximum value, and a second order central moment of squares of the impulse response samples.

In a further exemplary embodiment, the skewness of the impulse response is determined by evaluating a third-order central moment of squares of the impulse response samples.

In a still further exemplary embodiment, a system for measuring a quality parameter of an optical storage channel is provided. The system is equipped and configured to carry out a method for measuring a quality parameter of an optical storage system according to one or more of the above-described embodiments.

In yet another exemplary embodiment, a method for determining an optimum readout laser power for a non-diffraction-limited optical storage medium includes setting the laser power to an initial laser power, determining the width of the impulse response at the initial laser power according to a method of one or more of the above-described embodiments, and modifying the laser power until the width of the impulse response has reached its minimum.

Lastly, another exemplary embodiment provides a system equipped and configured to carry out the method for determining an optimum readout laser power for a non-diffraction-limited optical storage medium of the preceding embodiment.

Figure 1:
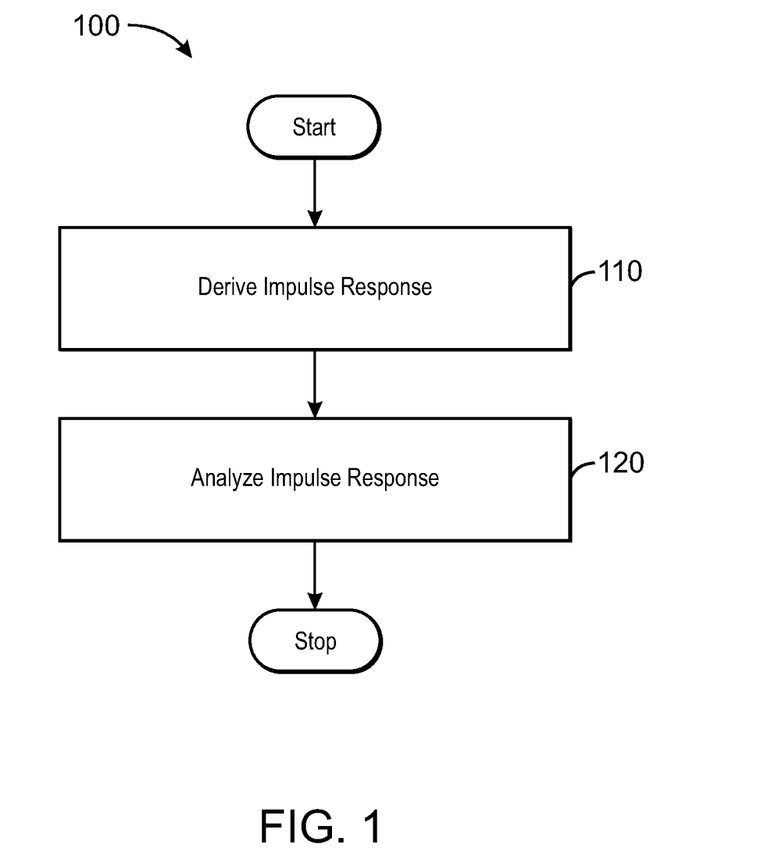
FIG. 1 is a process flow diagram showing an exemplary embodiment of a method for determining a quality parameter of an optical storage system and/or medium of the present invention.

As shown in FIG. 1, an exemplary method 100 includes the steps of deriving 110 the impulse response and analyzing 120 the impulse response. In one embodiment, deriving 110 the impulse response includes advantageously utilizing signal patterns that occur on the optical media at various locations, like e.g. the link headers of the optical medium, synchronization, or "sync" words, test signals/patterns, non-return to zero signals also named NRZ; or non-return to zero inverted signals also named NRZI. Such signal patterns are hereinafter collectively referred to as target signal patterns 130, and will typically contain, for example, patterns of shorter and longer sequences of pits and lands or marks and spaces.

Figure 2A:
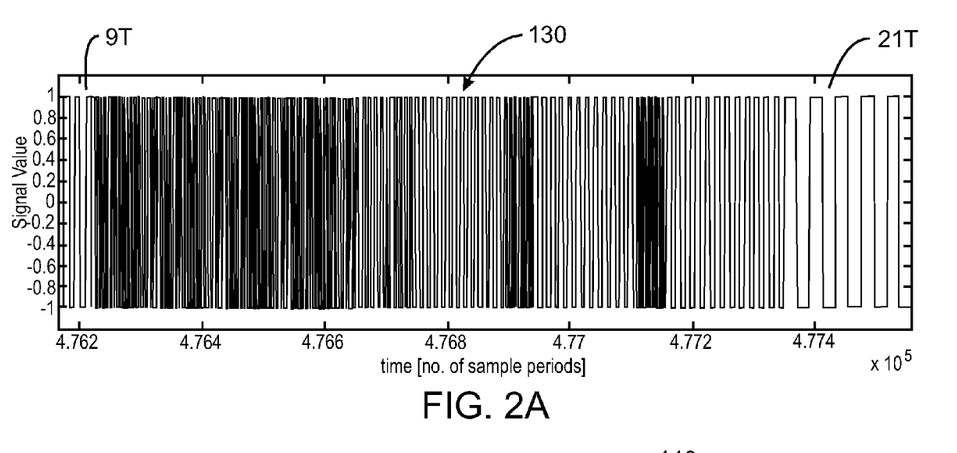
FIG. 2A is a graph that shows a target signal pattern, namely an NRZI signal as is more particularly described hereinafter.
Figure 2B:
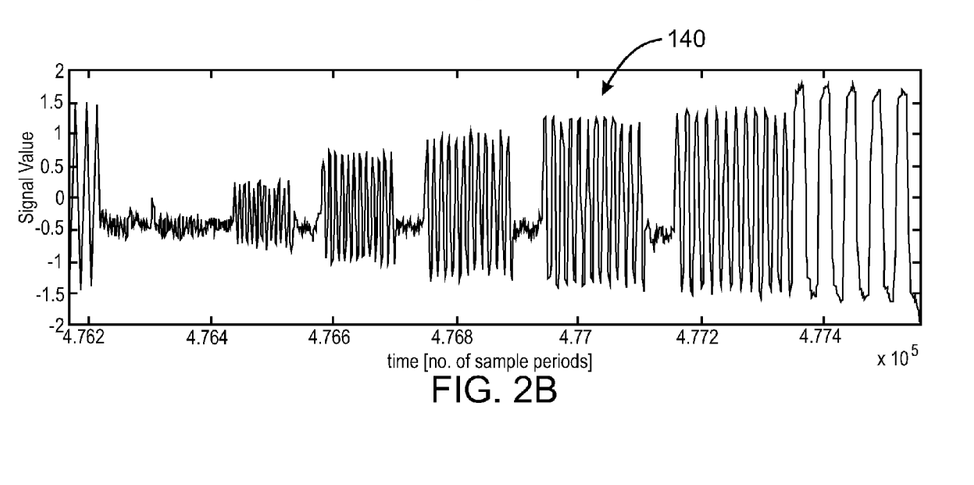
FIG. 2B is a graph that shows the optical channel output or readout signal corresponding to the target signal pattern of FIG. 2A.

An exemplary target signal pattern 130, in this case an NRZI signal pattern, is shown in FIG. 2A. The exemplary target signal pattern 130 includes patterns of 2T/2T, 3T/3T, . . . , 9T/9T and 21T/21T signals where T refers to the synchronized symbol clock period, and the notion of "aT/bT", as widely used in the field, denotes a recording pattern that alternates between lands being "a" times as long as the symbol clock, and pits being "b" times as long as the symbol clock. The 9T/9T and 21T/21T patterns are shown on the left and right sides of FIG. 2A, respectively. The exemplary target signal pattern 130 contains for each pattern a plurality of signal steps, i.e., a transition from pit to land or vice versa, with a corresponding ascending or descending slope in the signal. FIG. 2B illustrates the optical channel output signal 140, also denoted as readout signal in the following, that results from and corresponds to the exemplary target signal pattern 130. The readout signal 140 includes a plurality of step responses corresponding to the plurality of signal steps of the target signal pattern 130, especially in case of 21T/21T signals.

Figure 3:
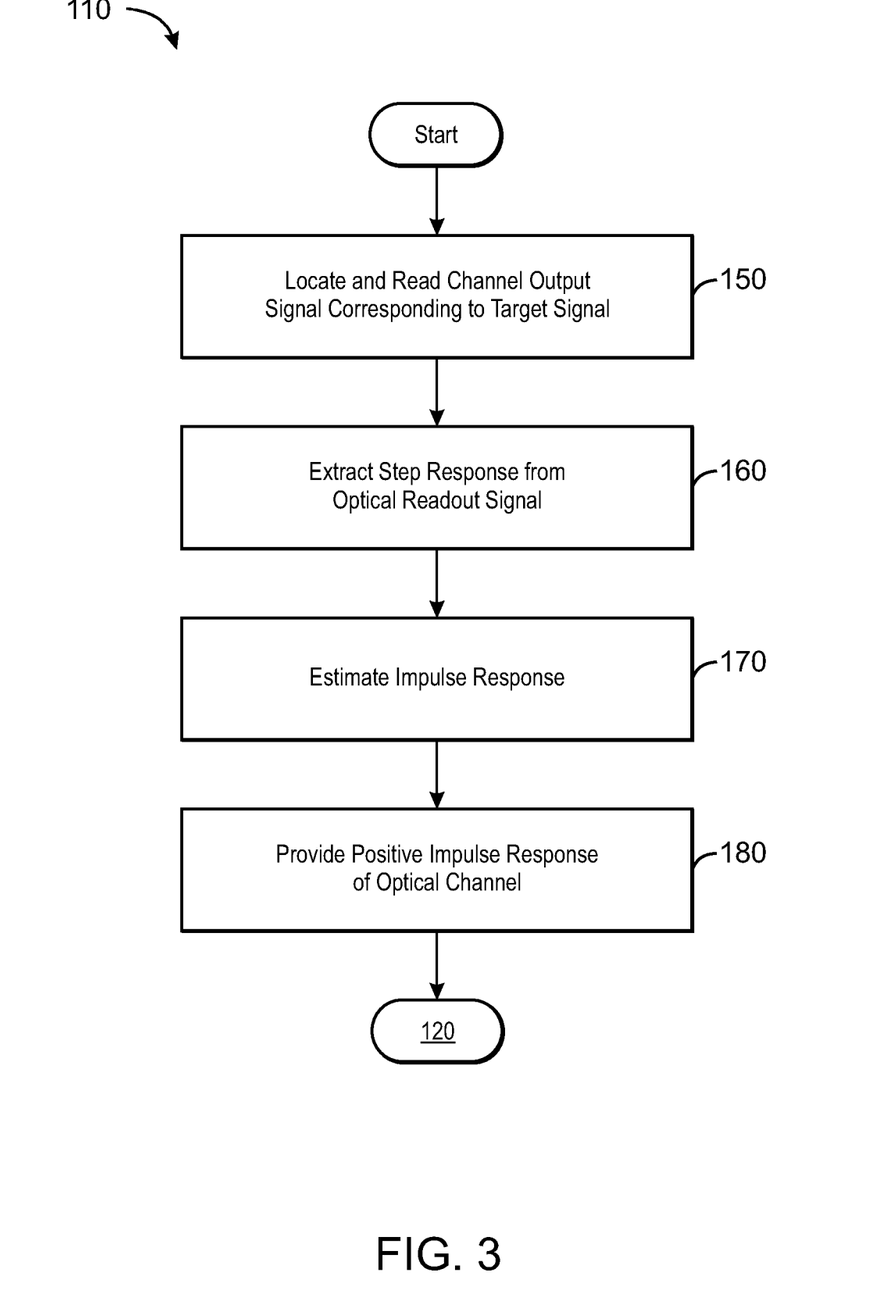
FIG. 3 is a process flow diagram that shows an exemplary embodiment of the process of deriving the impulse response of FIG. 1.

Accordingly, in one exemplary embodiment, deriving 110 the impulse response includes, as shown in FIG. 3, the process of locating and reading 150 the channel output signal corresponding to the target signal in the channel output signal, the process of extracting 160 the step response from the readout signal, the process of estimating 170 the impulse response, and the process of providing 180 the positive impulse response, or IR, of the optical channel.

The process of locating and reading 150 the channel output signal corresponding to the target signal pattern includes reading and comparing the signals on the optical medium with the desired target signal pattern 130 and, once the location of a target signal pattern 130 on the optical medium is identified, the readout signal 140 is produced by the optical system.

The process of extracting 160 the step response from the readout signal includes windowing, via digital signal processing or other techniques known to the skilled person, the center or relevant part, i.e., the step transition, of the readout signal 140 that results from the process of locating and reading 150 the target signal pattern.

The process of estimating 170 the impulse response, in one embodiment, includes applying methods, such as, for example, digital signal processing methods or mathematical algorithms, to determine the derivate of the step response of the readout signal 140 to thereby estimate the impulse response of the optical channel. Since the desired target signal pattern 130 likely includes several such desired target signal patterns 130 at one or more locations on the optical medium, the processes of locating and reading 150 the target signal pattern and of extracting 160 the step response from the readout signal 140 may be repeated as desired or necessary. The step responses occurring on the readout signal 140 may optionally be averaged together to form an average readout signal step response, the derivative of which is determined as described above to thereby determine an average impulse response of the readout system.

In another exemplary embodiment hereof the process of estimating 170 the impulse response may include approximating the impulse response. More particularly, where the target signal pattern 130 and, thus, the readout signal 140 contain only shorter patterns, e.g., 8T/8T and/or 9T/9T, the process of estimating the impulse response 170 may include approximating the impulse response by, for example, a Gauss or other curve-fitting method.

Figure 4:
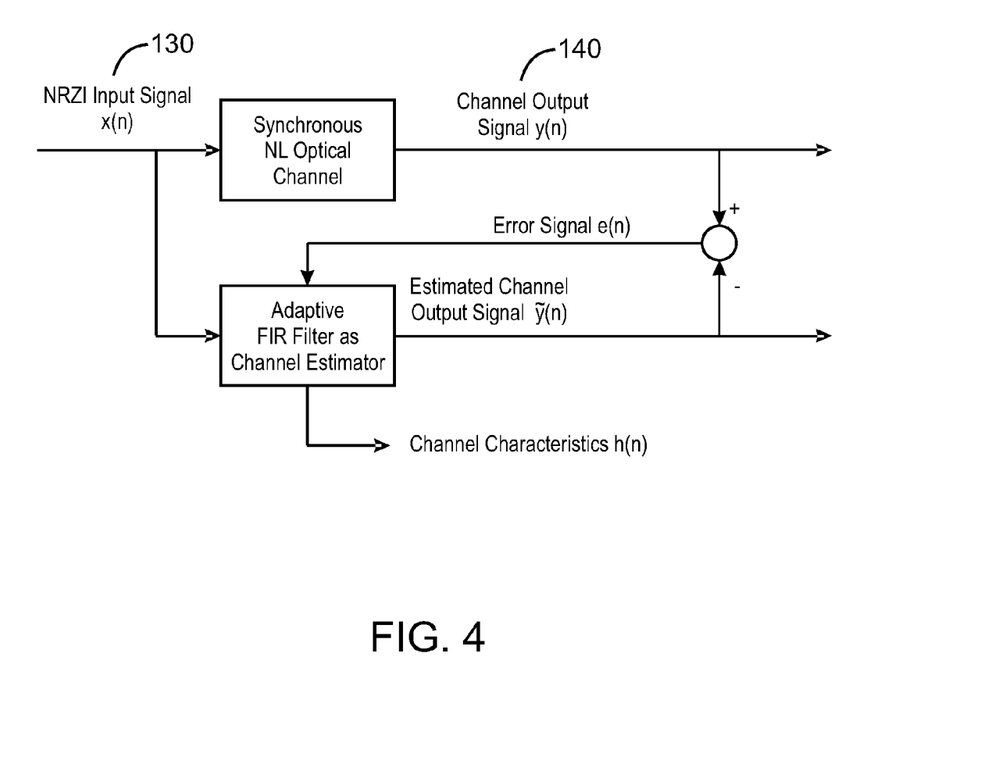
FIG. 4 is a block diagram of one exemplary embodiment of the process for estimating the impulse response of FIG. 1.

In yet another embodiment hereof the process of estimating 170 the impulse response may include using NRZI data as the target signal pattern 130. Assuming and exploiting that the NRZI data contained on the optical disc or medium is known, it can be used as an input in determining the impulse response of the optical channel. More particularly, the optical channel is in this embodiment modeled by a filter, such as, for example, a finite impulse response, or FIR, filter. Such a method requires placing the filter in parallel to the optical channel as shown in FIG. 4, wherein the optical channel input signal 130, in this case an NRZI signal, is designated x(n) and the channel output signal 140 is designated y(n). The filter coefficients are optimized, for example by least mean square error optimization, to minimize the error between the sequence of samples of the actual channel output signal y(n) and the sequence of samples of the estimated channel output signal ŷ(n). After such filter coefficient optimization, the filter's linear term h(n) provides the estimated impulse response of the optical channel.

The process of providing 180 the positive impulse response includes either providing the impulse response determined by the process of determining 170 the impulse response if the readout signal 140 contained an ascending or positive step transition, or may further include providing an inverted version of the impulse response if the readout signal 140 contained a descending or negative step transition. As shown in FIG. 3, the impulse response resulting from the process of providing 180 the positive impulse response is provided to the process of analyzing 120 the impulse response of the method 100.

Based on the impulse response resulting from the process of estimating 170 the impulse response and the process of providing 180 the positive impulse response, a storage density parameter S, also denoted as normalized information density, is determined by the process of analyzing 120 the impulse response of the method.

More particularly, the process of analyzing 120 the impulse response determines the storage density parameter of the impulse response by finding the maximum value thereof as well as the two points where the impulse response has decreased to a predefined fraction, e.g., 1/e, of its maximum value, where e is the natural logarithmic constant, i.e., approximately 2.718. Optionally, and for greater accuracy, the maximum value of the impulse response may be interpolated by using a higher-order interpolation method, such as, for example, a second order polynomial, cubic spline, or other similar higher-order method. Similarly, the two points having a value equal to, e.g., 1/e times the maximum value of the impulse response curve, hereinafter referred to as the 1/e points, will, if the impulse response curve is sampled or time-discrete, typically lie between two adjacent samples. Therefore, in such a case, the positions of the 1/e points on the impulse response curve may also be interpolated, such as, for example, by bilinear or other interpolation methods. The process of analyzing 120 the impulse response then determines the storage density parameter S by calculating the distance between the 1/e points.

Figure 5:
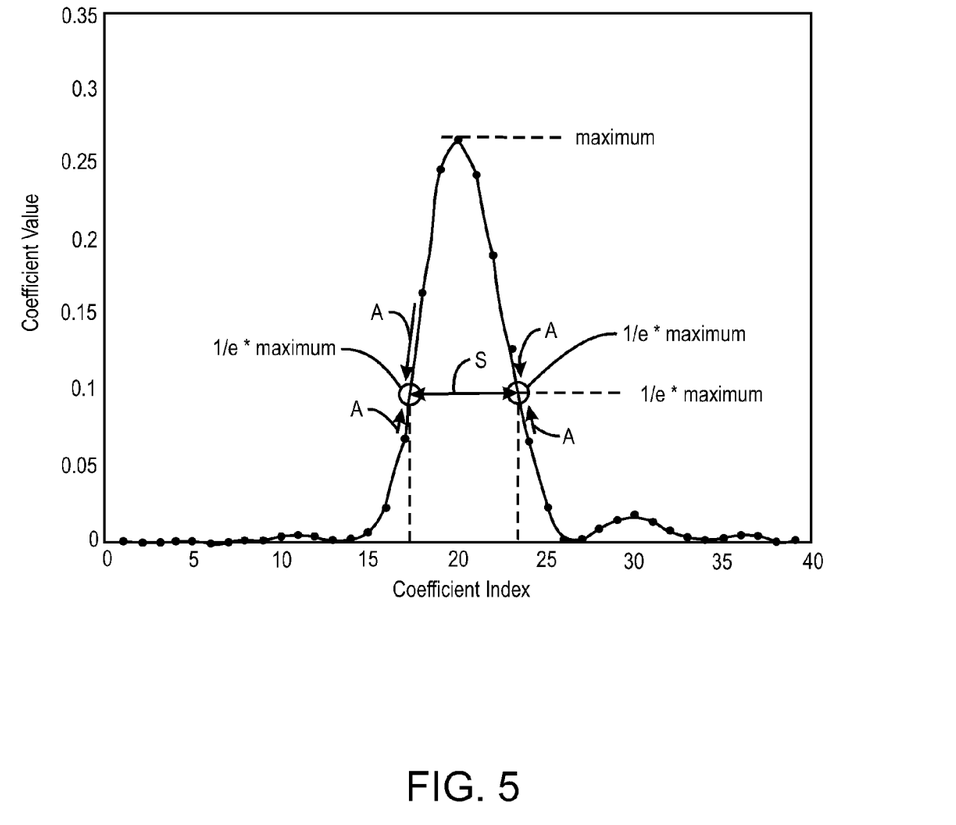
FIG. 5 is a graph that is useful in explaining an interpolation process of the 1/e points of an impulse response.

The above-described interpolation process of the 1/e points is illustrated in FIG. 5, wherein the solid dots indicate the sample values of the impulse response curve, the maximum value is designated by the label "maximum", the arrows A illustrate the interpolation of the 1/e points from the existing nearest neighbor samples or values of the impulse response curve, the 1/e points are indicated by the open circles and labeled as the 1/e*maximum, and the storage density parameter S is indicated by the double-headed arrow labeled S.

In another exemplary embodiment, the process of analyzing 120 the impulse response determines the storage density parameter S by
  individually squaring the samples of the provided impulse response to convert it into a non-negative sequence,
  normalizing the sequence so that its sum is 1 so that the sequence can formally be considered as a histogram or probability distribution,
  approximating the average of the distribution, which corresponds to the center of the IR, by the maximum of the sequence,
  determining the standard deviation relative to the approximated average, and
  determining the storage density parameter by multiplying the standard deviation by the square root of 8.

In yet another exemplary embodiment, the power center of the IR, which corresponds to the average µ of the above distribution is determined—instead of approximating it by the maximum—as the first central moment of the sequence of squared impulse response samples i(k):

$$\mu = \frac{\sum_{k=0}^{l-1} k \cdot i(k)^2}{\sum_{k=0}^{l-1} i(k)^2}.$$

wherein l denotes the length of the impulse response, which should be chosen such that a majority of the impulse response energy, of e.g. 99 percent, is included or covered. Having determined μ, the variance of i(k)² is calculated by:

$$\sigma_{pwr}^2 = \frac{\sum_{k=0}^{l-1}(k-\mu)^2 \cdot i(k)^2}{\sum_{k=0}^{l-1} i(k)^2},$$

and the standard deviation is determined as:

$$\sigma_{amp} = \sqrt{2} \cdot \sqrt{\sigma_{pwr}^2},$$

from which the storage density parameter S is derived as $S=\sqrt{8} \cdot \sigma_{amp}$.

Using the second order central moment of the squared impulse response samples to measure the storage density parameter S is much more stable and precise than taking the impulse response amplitudes themselves, especially in cases where the number of coefficients exceeds relevant components significantly.

The process of analyzing 120 the impulse response, in one embodiment hereof, determines the skewness of the impulse response as a measure of delayed contributions from the SuperRENS effect to the overall impulse response. For this, the average μ and the variance $\sigma^2_{pwr}$ of the squared and normalized impulse response considered as a distribution are determined same as described above. Using them, the skewness $\gamma^2_{pwr}$ of the squared impulse response is determined as the third central moment by:

$$\gamma_{pwr}^2 = \frac{\sum_{k=0}^{l-1}(k-\mu)^3 \cdot i(k)^2}{\sigma_{pwr}^3 \sum_{k=0}^{l-1} i(k)^2}.$$

The skewness for a symmetrical impulse response is zero, in which case there is no delayed SuperRENS contribution to the impulse response. A positive skewness indicates a certain delay between a SuperRENS contribution to the aperture and hence to the impulse response, relative to the diffraction-limited contributions plus any undelayed SuperRENS contributions thereto. In this case, the delayed SuperRENS contribution is lagging behind.

Figure 6:
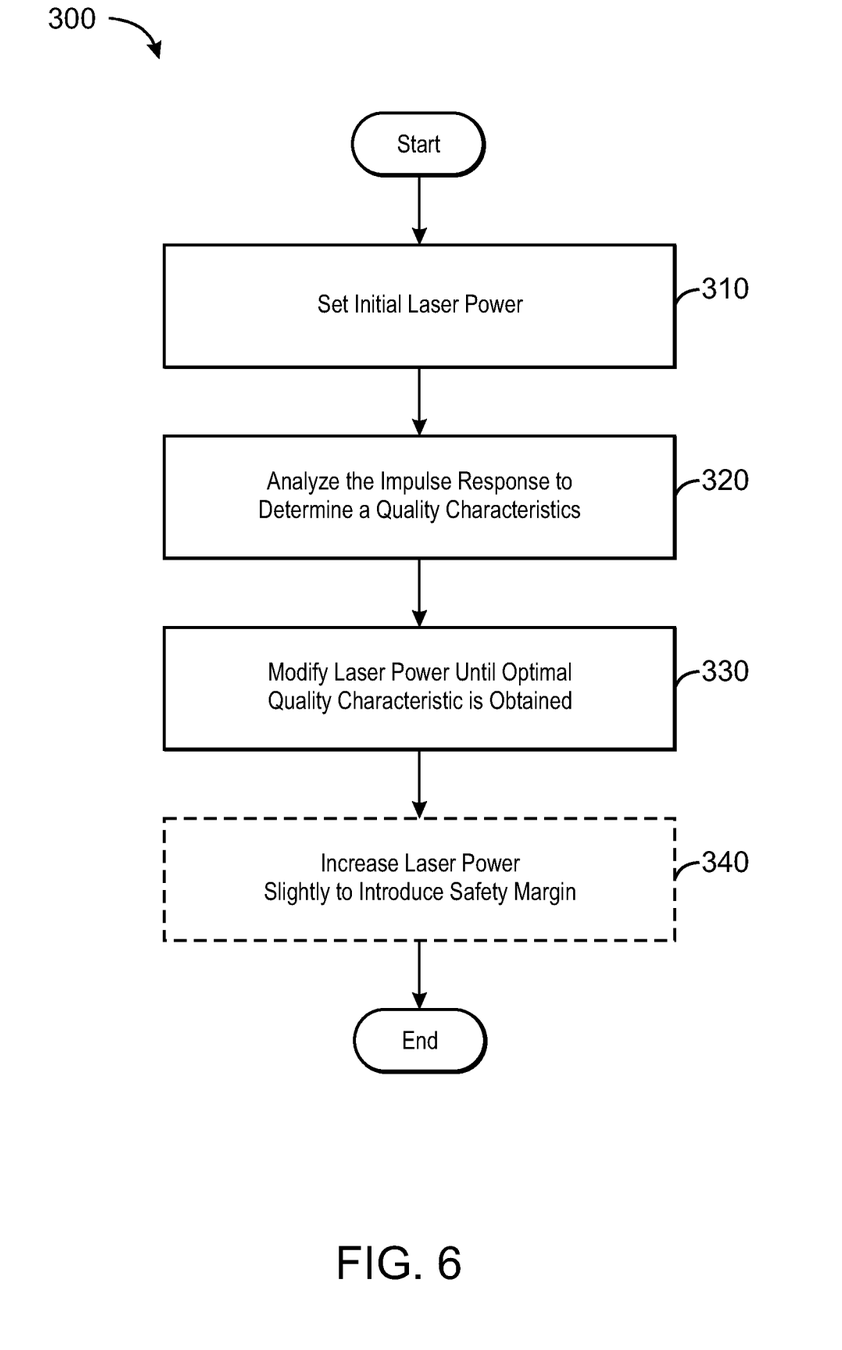
FIG. 6 is a process flow diagram that shows an exemplary embodiment of a method for determining an optimum readout laser power for an optical storage system and/or a non-diffraction-limited optical storage medium of the present invention.

In yet another embodiment of the present invention, the impulse response is analyzed to determine an optimum or preferred power setting for a laser in a non-diffraction-limited optical system. Reference is made to FIG. 6, wherein a method 300 for setting the laser power to an optimum power level is illustrated. Method 300 includes the processes of setting 310 an initial or starting laser power, analyzing 320 the impulse response to determine a quality characteristic, modifying 330 the laser power until an optimal or desired quality characteristic is obtained, and optionally increasing 340 the laser power once by a desired safety margin.

The process of setting 310 the laser power to an initial or starting power level comprises setting an initial or starting power level for the laser. In one embodiment of method 300, the process of analyzing 320 the impulse response to determine a quality characteristic includes determining the width of the impulse response according to one of the methods described herein in connection with method 100.

The process of modifying 330 the laser power until an optimal quality characteristic is obtained includes increasing or decreasing the initial laser power to a new laser power, and comparing the quality characteristic determined at the new laser power to the quality characteristic determined at the pervious or initial laser power. Based on that comparison, the laser power level is again increased or decreased, as appropriate, to a modified laser power and the quality characteristic determined at the previous laser power is compared to the quality characteristic determined at the modified laser power. This process is iterated until the optimal or desired quality characteristic, such as, for example, a minimum width of the impulse response, results. The power level at which the optimal or desired quality characteristic results is the optimum readout laser power. After finding this optimum readout laser power, the laser power may optionally be increased by a small safety margin amount, in order to sufficiently stay away from the SuperRENS threshold power.

The skilled person will appreciate that combining any of the above-recited features of the present invention together may be desirable.

The invention claimed is:

1. A readout-device-implemented method for measuring a quality parameter of an optical storage system, the storage system comprising the readout device and a non-diffraction-limited optical storage medium carrying predefined data, the method comprising:
    deriving, by the readout device, based on a readout of the predefined data, an impulse response of the optical storage system as a sequence of impulse response samples; and
    analyzing, by the readout device, the impulse response to determine as the quality parameter a width of the impulse response by evaluating a second-order central moment of squares of the impulse response samples.

2. A method according to claim 1, wherein the optical storage medium contains one of predefined sync data, predefined test data, and predefined user data, and the impulse response is derived at least in part by evaluating a readout signal of the predefined data from the storage medium.

3. A readout-device-implemented method for determining an optimum readout laser power for a non-diffraction-limited optical storage medium, the method comprising:
    setting, by the readout device, the laser power to a start laser power;
    determining, by the readout device, a width of an impulse response at the set laser power by deriving the impulse response as a sequence of impulse response samples based on a readout of predefined data and analyzing the impulse response to determine as the quality parameter the width of the impulse response by evaluating a second-order central moment of squares of the impulse response samples; and
    modifying, by the readout device, the laser power until the width of the impulse response has reached its minimum.

4. A readout-device-implemented method for measuring a quality parameter of an optical storage system, the storage system comprising the readout device and a non-diffraction-limited optical storage medium carrying predefined data, the method comprising:
    deriving, by the readout device, based on a readout of the predefined data, an impulse response of the optical storage system as a sequence of impulse response samples; and
    analyzing, by the readout device, the impulse response to determine as the quality parameter a skewness of the impulse response.

5. A method according to claim 4, wherein the optical storage medium contains one of predefined sync data, predefined test data, and predefined user data, and the impulse response is derived at least in part by evaluating a readout signal of the predefined data from the storage medium.

6. A method according to claim 4, wherein the skewness of the impulse response is determined by evaluating a third-order central moment of squares of the impulse response samples.

7. A system for measuring a quality parameter of an optical storage channel, comprising:
   a non-diffraction-limited optical storage medium carrying predefined data; and
   a readout device that derives an impulse response of the optical storage channel as a sequence of impulse response samples based on a readout of the predefined data and analyzes the impulse response to determine as the quality parameter a width of the impulse response by evaluating a second-order central moment of squares of the impulse response samples.

8. The system according to claim 7, wherein the optical storage medium contains one of predefined sync data, predefined test data, and predefined user data, and the readout device derives the impulse response at least in part by evaluating a readout signal of the predefined data from the storage medium.

9. A system for determining an optimum readout laser power, comprising:
   a non-diffraction-limited optical storage medium carrying predefined data; and
   a readout device that sets the laser power to a start laser power and determines a width of an impulse response at the set laser power and modifies the laser power until the width of the impulse response has reached its minimum, wherein the readout device determines the width of the impulse response by deriving the impulse response as a sequence of impulse response samples based on a readout of the predefined data and analyzing the impulse response to determine as the quality parameter the width of the impulse response by evaluating a second-order central moment of squares of the impulse response samples.

10. A system for measuring a quality parameter of an optical storage channel, the system comprising:
    a non-diffraction-limited optical storage medium caffying predefined data; and
    a readout device that derives an impulse response of the optical storage channel as a sequence of impulse response samples based on a readout of the predefined data and analyzes the impulse response to determine as the quality parameter a skewness of the impulse response.

11. The system according to claim 10, wherein the optical storage medium contains one of predefined sync data, predefined test data, and predefined user data, and the readout device derives the impulse response at least in part by evaluating a readout signal of the predefined data from the storage medium.

12. The system according to claim 10, wherein the readout device determines the skewness of the impulse response by evaluating a third-order central moment of squares of the impulse response samples.

* * * * *